J. C. DRAKE.
Cotton-Gin Saw-Cleaners.
No. 208,468.  Patented Oct. 1, 1878.
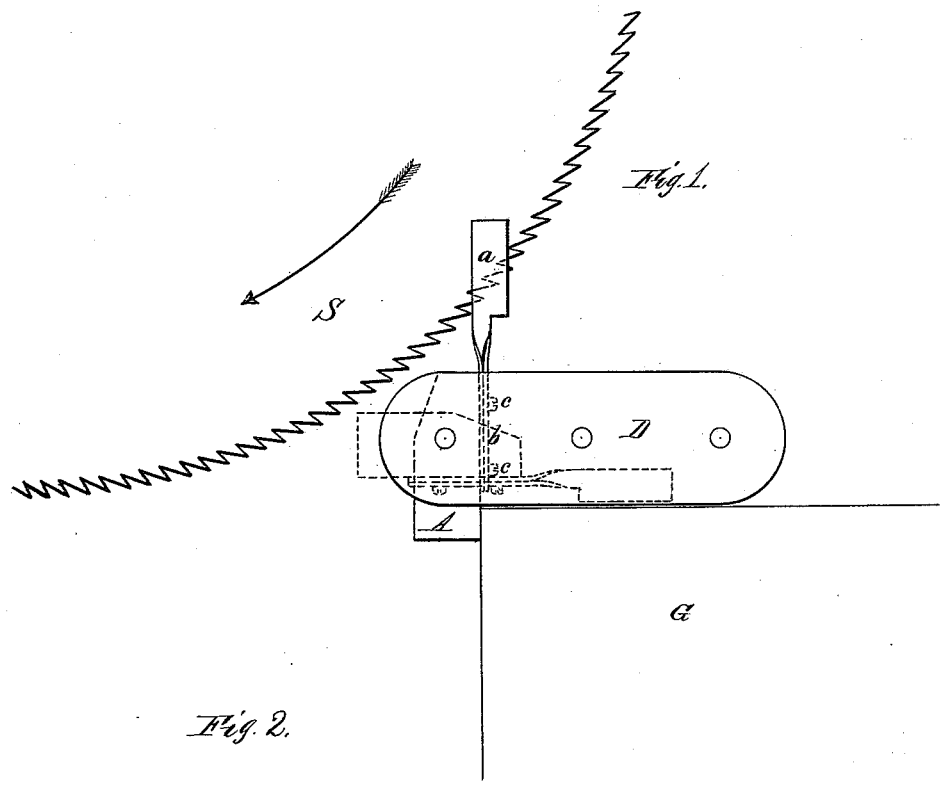
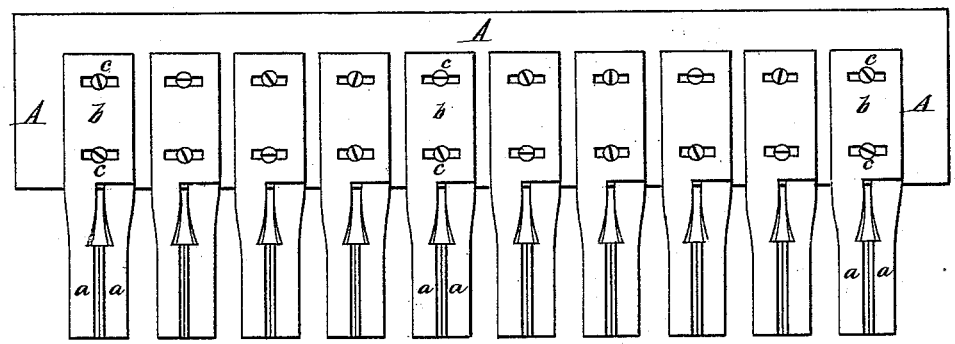
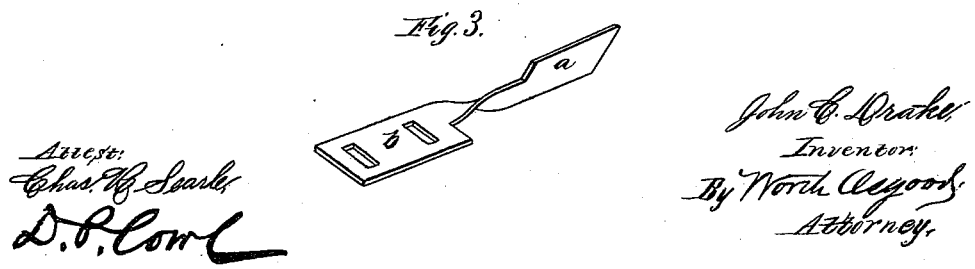
Attest:
Chas. H. Searles
D. P. Cowl
John C. Drake
Inventor
By Worth Osgood
Attorney

UNITED STATES PATENT OFFICE.

JOHN C. DRAKE, OF LITTLE ROCK, ARKANSAS, ASSIGNOR TO HIMSELF AND S. Z. HALL'S SOUTHERN COTTON GIN COMPANY, OF SAME PLACE.

IMPROVEMENT IN COTTON-GIN-SAW CLEANERS.

Specification forming part of Letters Patent No. 208,468, dated October 1, 1878; application filed March 2, 1878.

*To all whom it may concern:*

Be it known that I, JOHN C. DRAKE, of Little Rock, county of Pulaski, and State of Arkansas, have invented certain new and useful Improvements in Gin-Saw Gummers, of which the following is a full, clear, and exact description, reference being had to the accompanying drawings, and to the letters of reference marked thereon.

Figure 1 is a side elevation, showing the manner of hinging my improved gummer, and representing in dotted lines the position which it assumes when not in use. Fig. 2 is a plan view of the improved device, and Fig. 3 a perspective view of one of the blades detached from its bearings.

Like letters in all the figures indicate corresponding parts.

The object of my invention is to provide a simple, cheap, and efficient device for removing the cotton which ordinarily adheres to the saws of a cotton-gin, especially when the cotton is damp; and to accomplish this the invention consists in certain peculiarities of construction and arrangements of parts, all of which will be hereinafter first fully described, and then pointed out in the claims.

In ginning cotton it frequently becomes necessary to clean the saws, or "gum" them, as it is termed, necessitating the stoppage of the machine, and requiring a matter of thirty or more minutes to perform the operation satisfactorily, ordinarily by hand, and when the cotton is damp this process has to be repeated quite frequently, losing much of the time which might otherwise be utilized by the machine. To obviate this difficulty or disadvantage, I locate a series of spring-blades in rear of the saws, one pair of blades for each saw, and so arrange them that they may be turned up into contact with the saws whenever desired, and, by backing or reversing the saws, made to remove the matter adhering thereto.

S represents one of the saws, and A a horizontal bar, upon which the spring-blades are mounted.

Each blade $a$ is provided with a shank, $b$, having two slots for the adjusting-screws $c\ c$, &c. The blades are mounted in pairs upon the bar A, and so adjusted that the saws shall fall between the pairs whenever they are turned up for use. The distance between each of a pair of blades may be regulated by the set-screws, so that various thicknesses of saws may be accommodated; and the slots in the blades are sufficiently long to admit of varying the distance between any two pairs, whereby any irregularity in the adjustment of the saws upon their shaft may be counteracted by a corresponding adjustment of the gummers. The adjustability of the blades, moreover, enables the operator to regulate their pressure against the sides of the saws.

The bar A is hinged in two plates, D D, one at each end, which plates are attached to a convenient part of the gin-frame, and which permit the gummer to be revolved, as indicated in Fig. 1.

With this device, in order to clean the saws it is only necessary to stop the gin, revolve the bar A up to its working position, and then reverse the saws. One or two revolutions will be found sufficient to accomplish the desired object. The bar should then be returned to its position out of the way of the saws, as shown by the dotted lines, when the gin may be operated as before.

When not in its working position, the bar A rests against the sill G, which sustains the breast of the gin, or against cleats specially located, for the purpose of preventing said bar from revolving too far.

When thus constructed and arranged, the gummer is found to be little liable to get out of order; it does not dull the saws, since the blades are so cut as to bear only against the sides thereof; and it is easily kept in proper working condition, all the blades being capable of being ground without removing them from the bar.

Having thus fully described my invention, what I claim as new, and desire to secure by Letters Patent, is—

1. In a gin-saw gummer, the combination, with the revolving sustaining-bar, of the adjustable spring-blades mounted thereon, and adapted to operate substantially in the manner and for the purposes set forth.

2. The herein-described blade for a gin-saw gummer, the same being made of spring metal, and provided with two slots in its shank for the reception of the adjusting screws, substantially as shown and described.

3. In a gin-saw gummer, the combination, with the bar A, of a series of blades, $a$, mounted thereon in pairs, and made adjustable by means of the set-screws $c$ $c$, said bar being hinged within the gin-frame, and the whole adapted to operate substantially in the manner specified.

In testimony that I claim the foregoing I have hereunto set my hand in the presence of two witnesses.

JOHN C. DRAKE.

Witnesses:
  GEO. S. MORRISON,
  A. S. KELLAR.